US012674429B2

(12) United States Patent
Tachibana et al.

(10) Patent No.: US 12,674,429 B2
(45) Date of Patent: Jul. 7, 2026

(54) FUEL SUPPLY DEVICE FOR INTERNAL COMBUSTION ENGINE

(71) Applicant: TOYOTA JIDOSHA KABUSHIKI KAISHA, Toyota (JP)

(72) Inventors: Mina Tachibana, Toyota (JP); Yuki Suzuki, Kariya (JP); Tomihisa Tsuchiya, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 19/052,285

(22) Filed: Feb. 13, 2025

(65) Prior Publication Data

US 2025/0297584 A1 Sep. 25, 2025

(30) Foreign Application Priority Data

Mar. 21, 2024 (JP) ................................ 2024-045367

(51) Int. Cl.
*F02D 41/30* (2006.01)
*F02M 51/06* (2006.01)

(52) U.S. Cl.
CPC ........... *F02D 41/30* (2013.01); *F02M 51/061* (2013.01)

(58) Field of Classification Search
CPC ........... F02M 21/0239; F02M 21/0245; F02M 21/0242; F02M 21/0206; F02M 19/022; F02D 41/0027; F02D 41/30; F02D 41/3836; F02D 2200/0602; F02D 2250/31; F02D 53/02; F02D 51/061; Y02T 10/30
USPC ................................ 123/445, 446, 456, 480
See application file for complete search history.

(56) References Cited

U.S. PATENT DOCUMENTS 6,092,365 A * 7/2000 Leidel ...................... F02G 3/02 60/39.63
10,774,712 B2 * 9/2020 Andersson ............ F01N 3/2006
2006/0207568 A1 * 9/2006 Miyazaki ................ F02D 41/30 123/431
2010/0126146 A1 * 5/2010 Yamamoto .......... F02D 41/2454 60/286
2012/0103314 A1 * 5/2012 Jackson ................. F25J 1/0201 123/70 R
2018/0163678 A1 * 6/2018 Kato .................. F02M 37/0017

FOREIGN PATENT DOCUMENTS

JP 2022182969 A 12/2022

* cited by examiner

*Primary Examiner* — Logan M Kraft
*Assistant Examiner* — Johnny H Hoang

(57) ABSTRACT

A fuel supply device for an internal combustion engine includes a tank, a fuel injection valve, a fuel passage, a second shut-off valve configured to open and close the fuel passage, a temperature increasing mechanism that increases a temperature of fuel flowing into the second shut-off valve, and a controller that executes a fuel pressure control. In the fuel pressure control, the second shut-off valve is repeatedly opened and closed such that a fuel pressure in a section of the fuel passage connected to the downstream side of the second shut-off valve falls within a range defined by an upper limit value and a lower limit value. The controller operates the temperature increasing mechanism such that the temperature of the fuel flowing into the second shut-off valve is increased during the execution of the fuel pressure control.

5 Claims, 6 Drawing Sheets

FUEL SUPPLY DEVICE FOR INTERNAL COMBUSTION ENGINE

CROSS-REFERENCE TO RELATED APPLICATIONS

This application is based upon and claims the benefit of priority from Japanese Patent Application No. 2024-045367, filed on Mar. 21, 2024, the entire contents of which are incorporated herein by reference.

BACKGROUND

1. Field

The present disclosure relates to a fuel supply device for an internal combustion engine.

2. Description of Related Art

For example, an internal combustion engine disclosed in Japanese Laid-Open Patent Publication No. 2022-182969 reduces the pressure of gas fuel stored in a tank before supplying the gas fuel to fuel injection valves.

As a method of fuel pressure control such as the one described above, the following control can be implemented.

Specifically, an electromagnetic valve is provided in a fuel passage that connects a tank for storing fuel to a fuel injection valve that supplies fuel to a cylinder. The electromagnetic valve opens and closes the fuel passage. An allowable upper limit value and an allowable lower limit value are set for the target of the fuel pressure. When fuel injection from the fuel injection valve is performed in a state in which the electromagnetic valve is closed, fuel flows out from the fuel passage downstream of the electromagnetic valve. As a result, the fuel pressure downstream of the electromagnetic valve decreases. When the downstream fuel pressure reaches the lower limit value, the electromagnetic valve is driven to open. This allows fuel to be supplied to the fuel passage downstream of the electromagnetic valve. Consequently, the fuel pressure downstream of the electromagnetic valve increases. When the downstream fuel pressure reaches the upper limit value, the electromagnetic valve is driven to close. By repeatedly driving the electromagnetic valve to open and close in this manner, the pressure of the fuel downstream of the electromagnetic valve, which is the pressure of the fuel supplied to the fuel injection valve, is adjusted to a fuel pressure within a range defined by the upper limit value and the lower limit value.

When performing fuel pressure control that involves repeated opening and closing of the electromagnetic valve, wear may progress in sliding parts of the electromagnetic valve or similar components due to the repeated opening and closing operations during the execution of fuel pressure control.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a fuel supply device for an internal combustion engine includes a tank that stores fuel, a fuel injection valve that supplies fuel to a cylinder, a fuel passage that supplies the fuel in the tank to the fuel injection valve, an electromagnetic valve that is provided in the fuel passage so as to open and close the fuel passage, a temperature increasing mechanism that increases a temperature of an inflow fuel that is fuel flowing into the electromagnetic valve, and a processing circuitry that executes a fuel pressure control. In the fuel pressure control, the electromagnetic valve is repeatedly opened and closed such that a fuel pressure in a section of the fuel passage connected to a downstream side of the electromagnetic valve in a flow direction of the fuel in the fuel passage is controlled, and that a fuel pressure in the fuel passage falls within a range defined by an upper limit value and a lower limit value. The processing circuitry is configured to execute a temperature increasing process that operates the temperature increasing mechanism to increase the temperature of the inflow fuel during execution of the fuel pressure control.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

A fuel supply device 200 for an internal combustion engine 10 according to an embodiment will now be described with reference to FIGS. 1 to 4.

Internal Combustion Engine, Fuel Supply Device, and Controller

Figure 1:
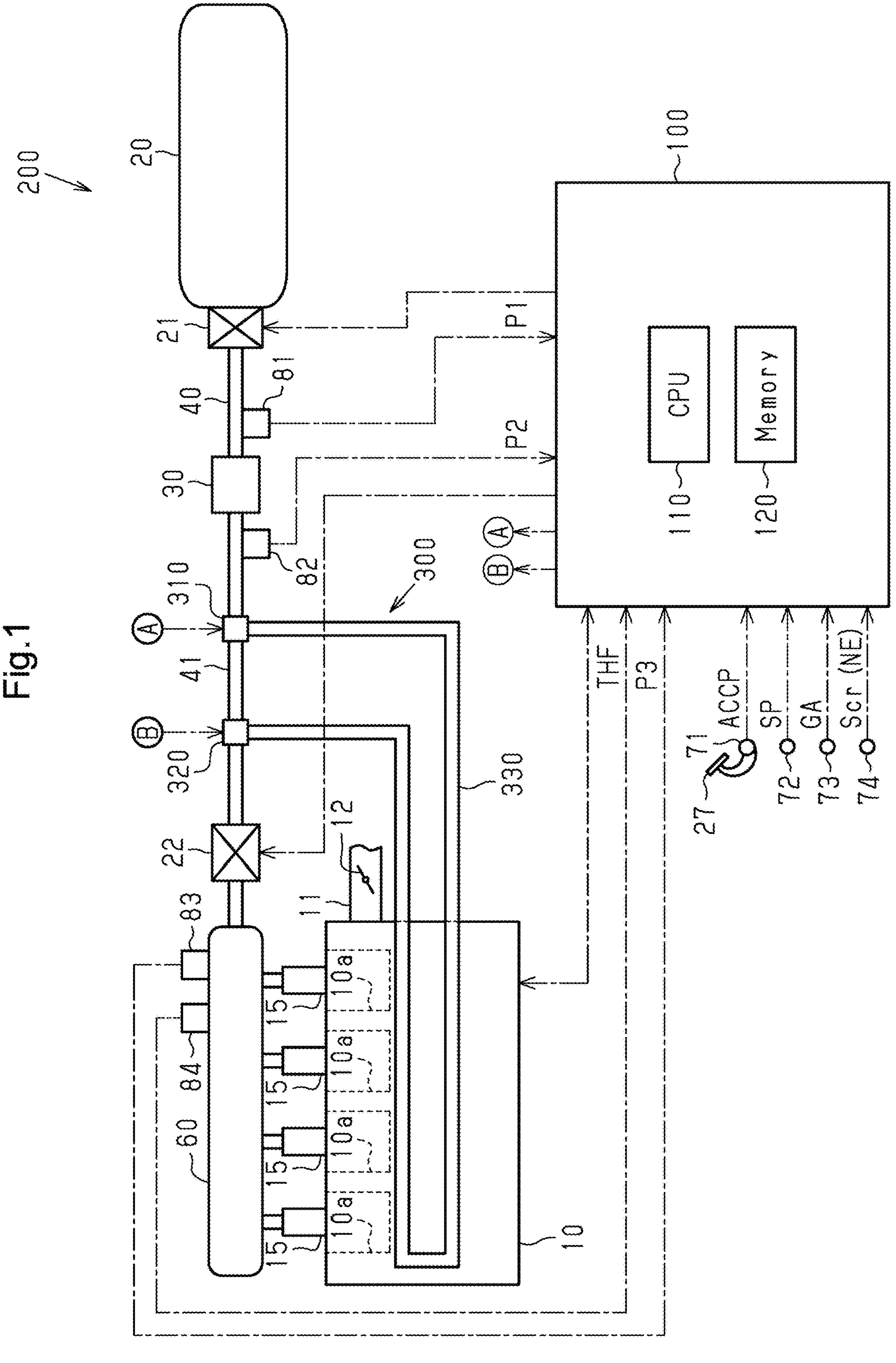
FIG. 1 is a schematic diagram of an internal combustion engine, a fuel supply system, and a controller according to an embodiment.

The internal combustion engine 10 shown in FIG. 1 is mounted on a vehicle, and uses hydrogen gas, which is gas fuel, as fuel.

A throttle valve 12 that adjusts an intake air amount is provided in an intake passage 11 of the internal combustion engine 10.

A fuel supply device 200 included in the internal combustion engine 10 includes fuel injection valves 15, a tank 20, a fuel pipe 40, a first shut-off valve 21, a second shut-off valve 22, a pressure reducing valve 30, a delivery pipe 60, and a temperature increasing mechanism 300.

The fuel injection valves 15 supply fuel to cylinders 10*a* of the engine 10.

The tank 20 stores hydrogen gas, which is gas fuel, in a high-pressure compressed state.

The fuel pipe 40 connects the tank 20 and the delivery pipe 60.

The fuel injection valves 15 are connected to the delivery pipe 60. The fuel pipe 40 and the delivery pipe 60 are a fuel passage connecting the tank 20 and the fuel injection valves 15. The hydrogen gas stored in the tank 20 is supplied to the fuel injection valves 15 via the fuel pipe 40 and the delivery pipe 60.

The first shut-off valve 21, the pressure reducing valve 30, and the second shut-off valve 22 are arranged in the fuel pipe 40 in this order in a direction of fuel flow.

The first shut-off valve 21 is an electromagnetic valve arranged near an outlet of the tank 20. When the first shut-off valve 21 is open, fuel is supplied from the tank 20 to the fuel pipe 40. When the first shut-off valve 21 is closed, the supply of fuel from the tank 20 to the fuel pipe 40 is stopped.

The pressure reducing valve 30 decompresses the high-pressure hydrogen gas stored in the tank 20 to a predetermined level (for example, about 4 MPa), and supplies the decompressed hydrogen gas to the fuel injection valves 15.

The second shut-off valve 22 is an electromagnetic valve that opens and closes the fuel passage, and is disposed near the delivery pipe 60 in the fuel passage. When the second shut-off valve 22 is opened by energization, fuel is supplied to the delivery pipe 60. When the second shut-off valve 22 is closed due to the de-energization, the supply of fuel to the delivery pipe 60 is stopped.

The first shut-off valve 21 and the second shut-off valve 22 are closed while the operation of the internal combustion engine 10 is stopped. On the other hand, the first shut-off valve 21 and the second shut-off valve 22 are basically open during operation of the internal combustion engine 10.

The first pressure sensor 81 is provided in the fuel pipe 40 between the first shut-off valve 21 and the pressure reducing valve 30. The first pressure sensor 81 detects a first pressure P1 which is a fuel pressure in the fuel pipe 40 between the first shut-off valve 21 and the pressure reducing valve 30.

The second pressure sensor 82 provided in the fuel pipe 40 between the pressure reducing valve 30 and the second shut-off valve 22 detects a second pressure P2 that is the fuel pressure in the fuel pipe 40 between the pressure reducing valve 30 and the second shut-off valve 22.

A third pressure sensor 83 provided in the delivery pipe 60 detects a third pressure P3, which is a fuel pressure in the delivery pipe 60. A temperature sensor 84 provided in the delivery pipe 60 detects a fuel temperature THF which is the temperature of the fuel in the delivery pipe 60.

The fuel supply system of the internal combustion engine 10 is provided with a temperature increasing mechanism 300 which increases the temperature of the inflow fuel which is the fuel which flows into the second shut-off valve 22. The fuel passage connected to the upstream side of the second shut-off valve 22 in the flow direction of the fuel in the fuel passage is referred to as an upstream-side fuel passage. The upstream-side fuel passage of the present embodiment includes an upstream-side fuel pipe 41 which is a fuel pipe connecting the pressure reducing valve 30 and the second shut-off valve 22.

The temperature increasing mechanism 300 includes a pipe 330, a first electromagnetic valve 310, and a second electromagnetic valve 320. The first electromagnetic valve 310 is provided at a connection portion between the pipe 330 and the upstream-side fuel pipe 41. The second electromagnetic valve 320 is provided at a connection portion between the pipe 330 and the upstream-side fuel pipe 41 and at a portion downstream of the first electromagnetic valve 310.

The pipe 330 is connected in parallel to the upstream-side fuel pipe 41. A part of the pipe 330 is disposed so as to pass through the vicinity of a high-temperature portion of the internal combustion engine 10, which is a heat source. Therefore, the fuel heated by the heat source flows through the pipe 330. Examples of the high-temperature portion of the internal combustion engine 10 include a cylinder block and a cylinder head.

The first electromagnetic valve 310 and the second electromagnetic valve 320 are operation valves that regulate a flow connection state between the upstream-side fuel pipe 41 and the pipe 330. The first electromagnetic valve 310 is provided at a connection portion between one of both ends of the pipe 330 and the upstream-side fuel pipe 41. The second electromagnetic valve 320 is provided at a connection portion between the other end portion of the pipe 330 and the upstream-side fuel pipe 41.

When the operation positions of the valve bodies of the first electromagnetic valve 310 and the second electromagnetic valve 320 are set to the first mode, the communication between the upstream-side fuel pipe 41 and the pipe 330 is blocked. Therefore, in the first mode, the fuel that has received heat from the heat source does not flow into the upstream-side fuel pipe 41. On the other hand, when the operation positions of the valve bodies of the first electromagnetic valve 310 and the second electromagnetic valve 320 are set to the second mode, the upstream-side fuel pipe 41 and the pipe 330 communicate with each other. Therefore, in the second mode, the fuel that has received heat from the heat source flows into the upstream-side fuel pipe 41.

The controller 100 performs various controls such as fuel injection of the internal combustion engine 10 by controlling various control targets such as the throttle valve 12, the fuel injection valves 15, the first shut-off valve 21, the second shut-off valve 22, the first electromagnetic valve 310, and the second electromagnetic valve 320. The controller 100 includes a CPU 110 and a memory 120 constituted by a ROM, a RAM, and the like. The CPU 110 executes a program stored in the memory 120 to perform various controls.

The controller 100 refers to various values used to control the internal combustion engine 10. For example, the controller 100 refers to detection values of the first pressure sensor 81, the second pressure sensor 82, the third pressure sensor 83, and the temperature sensor 84. Further, the controller 100 refers to a detection signal of an accelerator position sensor 71 that detects an accelerator operation amount ACCP that is an operation amount of an accelerator pedal 27 operated by a driver of the vehicle on which the internal combustion engine 10 is mounted. In addition, the controller 100 refers to a detection signal of a speed sensor 72 that detects a vehicle speed SP of a vehicle on which the internal combustion engine 10 is mounted. Further, the controller 100 refers to a detection signal of an air flow meter 73 that detects an intake air amount GA of the internal combustion engine 10, and a detection signal Scr of a crank angle sensor 74 that detects a rotation angle of a crankshaft of the internal combustion engine 10.

The controller 100 calculates the engine rotation speed NE based on the detection signal Scr of the crank angle sensor 74. In addition, the controller 100 calculates an engine load factor KL based on the engine rotation speed NE and the intake air amount GA. The engine load factor KL represents the ratio of the current cylinder inflow air amount to the cylinder inflow air amount at the time of steady operation of the internal combustion engine 10 in a full load state at the current engine rotation speed NE. The cylinder inflow air amount is the amount of air that flows into each cylinder in the intake stroke.

Hydrogen gas, which serves as the engine fuel, has a wider range of combustible air-fuel mixtures compared to gasoline and can burn even with a relatively lean air-fuel mixture. Therefore, the controller 100 adjusts the output of the internal combustion engine 10 through the following combustion control.

That is, the controller 100 calculates a requested output Pe, which is a requested value of the engine output of the internal combustion engine 10, based on the accelerator operation amount ACCP and the like. The controller 100 sets the requested injection amount Qd based on the requested output Pe. The requested injection amount Qd is a target value of the fuel injected from one fuel injection valve 15 in one combustion cycle. Based on the target air-fuel ratio AFt and the requested injection amount Qd, the controller 100 calculates a requested air amount GAd that is a target value of the intake air amount requested for obtaining the target air-fuel ratio AFt. The target air-fuel ratio AFt of the present embodiment is a lean air-fuel ratio such as an excess air ratio $\lambda$=2.5 to 3.0, for example. Then, the controller 100 controls the fuel injection valves 15 such that an amount of fuel corresponding to the requested injection amount Qd is injected. Further, the controller 100 controls the opening degree of the throttle valve 12 so that an amount of air corresponding to the requested air amount GAd is introduced into the cylinder. In this way, in the internal combustion engine 10, the output adjustment is performed by changing the air-fuel ratio of the air-fuel mixture through the adjustment of the fuel injection amount and the intake air amount.

Fuel Pressure Control

The controller 100 executes fuel pressure control for controlling the pressure of the fuel supplied to the fuel injection valves 15, that is, the fuel pressure in the fuel passage connected to the downstream side of the second shut-off valve 22. In the fuel pressure control, the second shut-off valve 22 is repeatedly opened and closed so that the fuel pressure in the fuel passage connected to the downstream side of the second shut-off valve 22 becomes a pressure within the control range CR defined by an upper limit value PtU and a lower limit value PtL. A target fuel pressure Pt in the fuel pressure control is lower than the second pressure P2, which is the fuel pressure reduced by the pressure reducing valve 30, and is set in advance. For example, the target pressure Pt is about 1 Mpa. An upper limit value of the fuel pressure allowable with respect to the target pressure Pt is set to an upper limit value PtU. Further, a lower limit value of the fuel pressure allowable with respect to the target pressure Pt is set to a lower limit value PtL.

Figure 2:
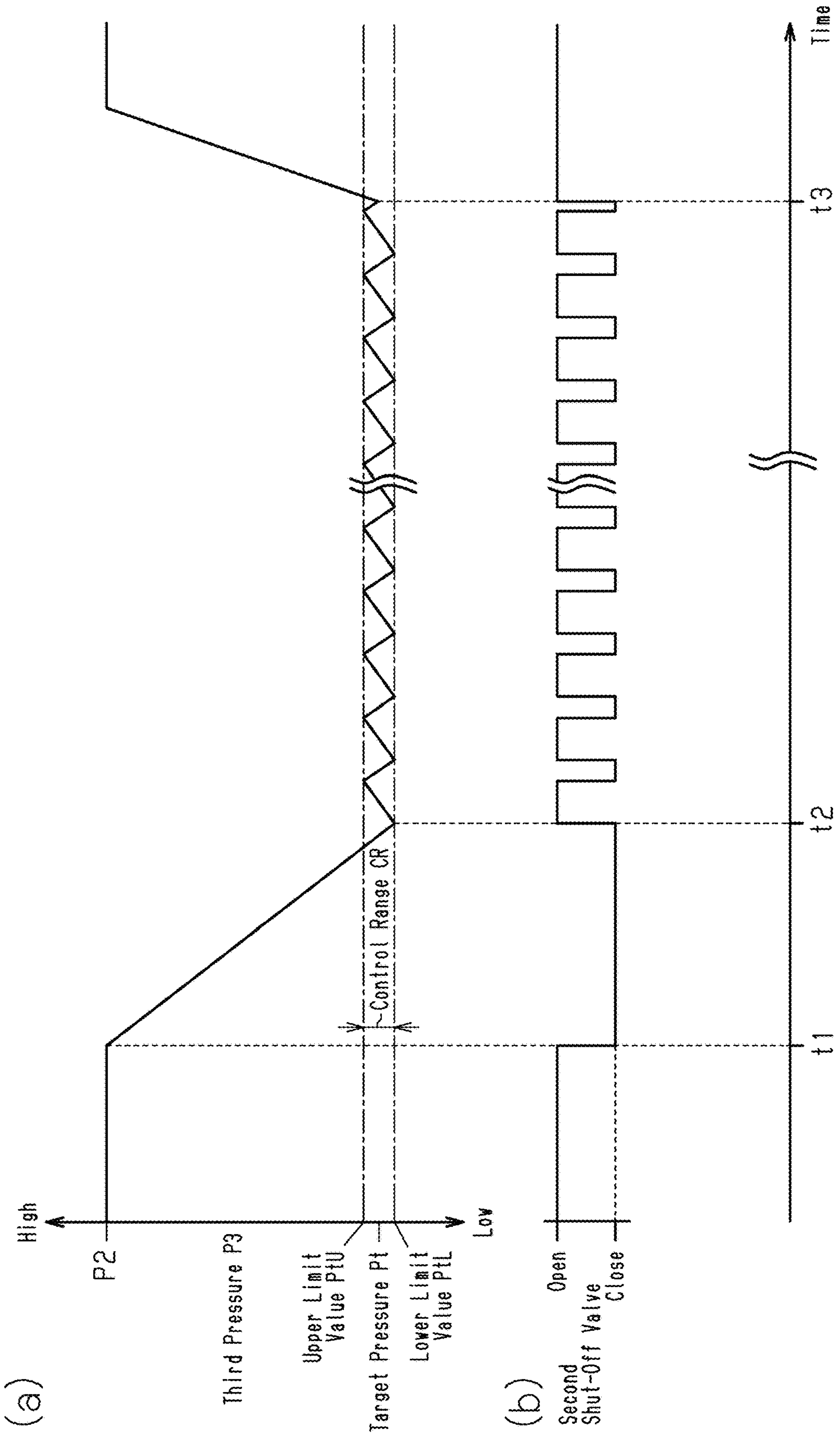
FIG. 2 is a timing diagram showing a fuel pressure control, where part (a) shows changes in a fuel pressure, and part (b) shows an operating state of a second shut-off valve.

FIG. 2 shows an example of fuel pressure control. Part (a) of FIG. 2 shows the changes in the third pressure P3, and part (b) of FIG. 2 shows the operating states of the second shut-off valve 22.

Before a point in time t1, the hybrid vehicle is traveling normally, and the second shut-off valve 22 is maintained in the open state. The third pressure P3 is equal to the second pressure P2, which has been reduced by the pressure reducing valve 30.

At the point in time t1, when the internal combustion engine 10 is requested to be operated at idle, the second shut-off valve 22 is closed and the closed state is maintained. While the second shut-off valve 22 is closed, the amount of fuel in the delivery pipe 60 decreases each time fuel is injected from the fuel injection valves 15. Therefore, the third pressure P3 gradually decreases.

At a point in time t2, when the third pressure P3 reaches the lower limit value PtL, the second shut-off valve 22 is opened. Thus, the fuel is supplied to the fuel passage downstream of the second shut-off valve 22. Therefore, the fuel pressure downstream of the second shut-off valve 22 increases. The second shut-off valve 22 is closed when the third pressure P3 reaches the upper limit values PtU. By repeatedly opening and closing the second shut-off valve 22 in this way, the pressure of the fuel downstream of the second shut-off valve 22 and supplied to the fuel injection valves 15 is adjusted to a pressure within the control range CR defined by the upper limit value PtU and the lower limit value PtL.

As described above, when the requested injection amount Qd decreases, for example, during idling, the fuel injection control is performed to maintain the third pressure P3 at a low level, so that a small amount of fuel is injected from the fuel injection valves 15 with high accuracy.

When the execution request of the fuel pressure control is not present at a point in time t3, the second shut-off valve 22 is maintained in the open state. While the second shut-off valve 22 is open, fuel is supplied from the tank 20 toward the delivery pipe 60. Therefore, the third pressure P3 gradually increases toward the second pressure P2.

Temperature Increasing Process

When the fuel pressure control, in which the second shut-off valve 22 is repeatedly opened and closed, is executed, there is a possibility that wear progresses in a sliding portion or the like of the second shut-off valve 22 along with the opening and closing operation during the execution of the fuel pressure control. Further, the electromagnetic coil of the second shut-off valve 22 may generate heat due to the opening and closing operation during the fuel pressure control. In order to suppress the occurrence of such a disadvantage, the controller 100 executes a temperature increasing process of operating the temperature increasing mechanism 300 such that the temperature of the fuel flowing into the second shut-off valve 22 is increased during the execution of the fuel pressure control. Hereinafter, the fuel flowing into the second shut-off valve 22 is referred to as inflow fuel.

Figure 3:
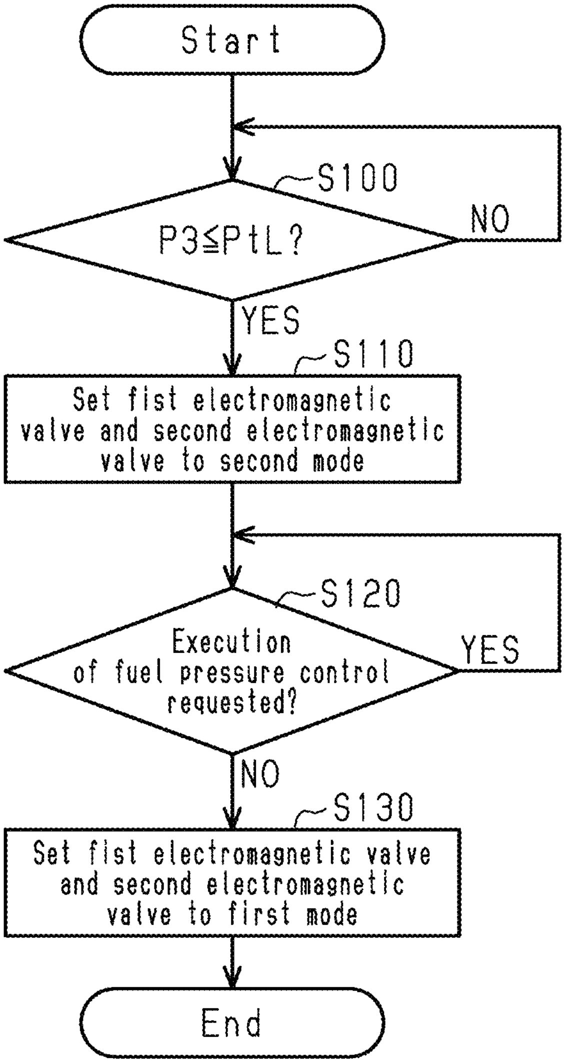
FIG. 3 is a flowchart showing a procedure of processes executed by the controller.

FIG. 3 shows a procedure of the temperature increasing process executed by the controller 100. In the process shown in FIG. 3, a program stored in the memory 120 of the controller 100 is executed by the CPU 110. The process shown in FIG. 3 is started when the execution of the fuel pressure control is requested. The execution request of the fuel pressure control is requested, for example, when the operation state of the internal combustion engine 10 shifts to an idle operation state. In the following description, the number of each step is represented by the letter S followed by a numeral.

When this process is started, the controller 100 determines whether the third pressure P3 is less than or equal to the lower limit value PtL (S100). Then, the controller 100 repeatedly executes the processing of S100 until it is determined that the third pressure P3 is less than or equal to the lower limit value PtL.

When it is determined that the third pressure P3 is less than or equal to the lower limit value PtL (S100: YES), the controller 100 operates the first electromagnetic valve 310 and the second electromagnetic valve 320 to set the second mode (S110). When the first electromagnetic valve 310 and the second electromagnetic valve 320 are set to the second mode, the upstream-side fuel pipe 41 and the pipe 330 are in a flow connection state. Therefore, the fuel that has received heat from the internal combustion engine 10, which is a heat source, flows into the upstream-side fuel pipe 41, and the temperature of the fuel flowing into the second shut-off valve 22 is increased.

Next, the controller 100 determines whether there is an execution request for fuel pressure control at present (S120). Then, the controller 100 repeatedly executes the S120 process until it is determined that there is no execution request.

When it is determined that there is no execution request for the fuel pressure control, the controller 100 operates the first electromagnetic valve 310 and the second electromagnetic valve 320 to set the first mode (S130). When the first electromagnetic valve 310 and the second electromagnetic valve 320 are set to the first mode, the upstream-side fuel pipe 41 and the pipe 330 are in a non-flow connection state. Therefore, the temperature of the fuel flowing into the second shut-off valve 22 is not increased. The controller 100 determines that there is no execution request for the fuel pressure control, for example, when the operation state of the internal combustion engine 10 shifts to a state where the engine load is higher than in the idle operation state.

When the S130 process is executed, the controller 100 ends the present process.

Operation of the Present Embodiment

Figure 4:
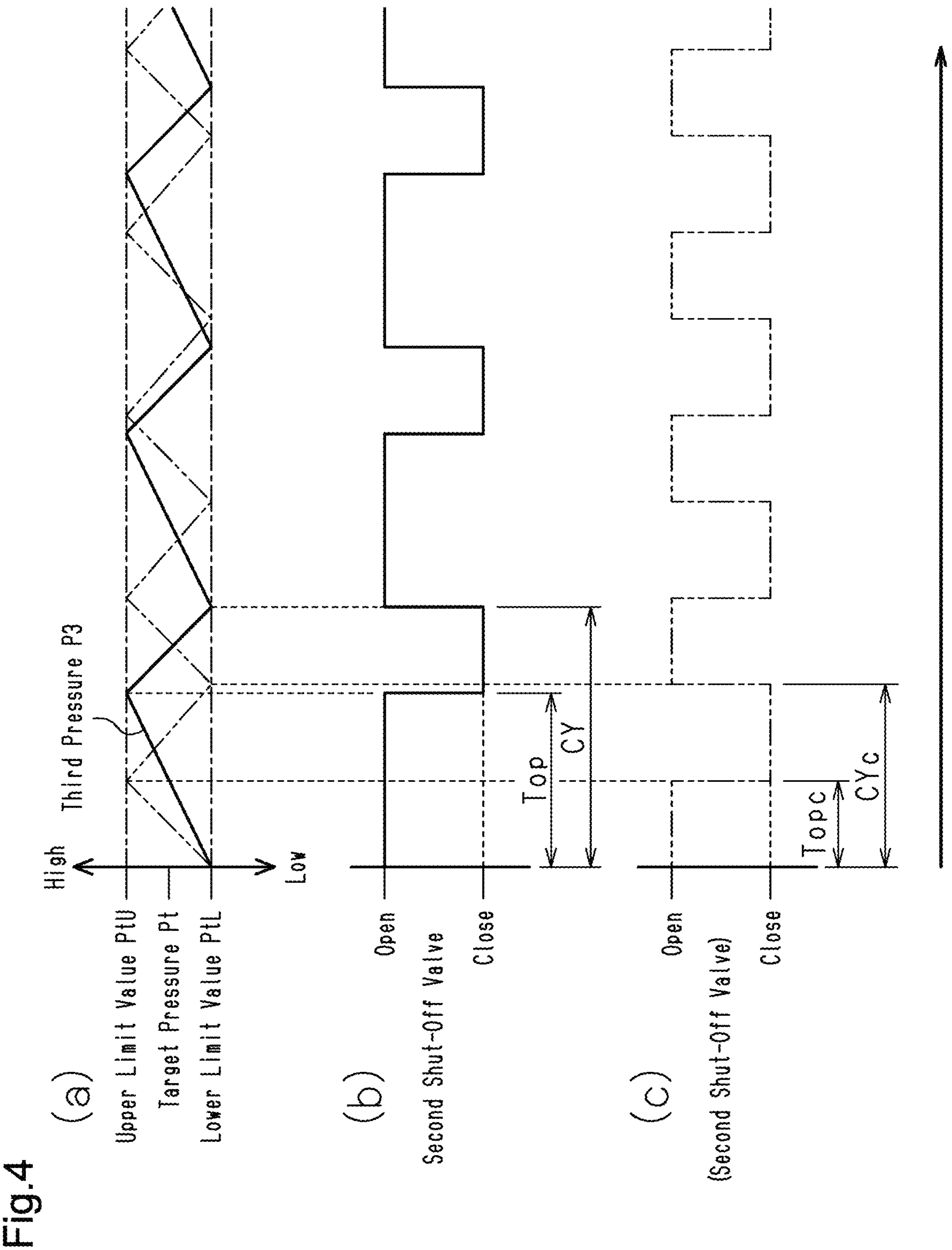
FIG. 4 is a diagram showing operation of a temperature increasing process, where part (a) shows changes in a third pressure, part (b) shows an operating state of the second shut-off valve according to the present embodiment, and part (c) shows an operating state of the second shut-off valve in a case in which no temperature increasing mechanism is employed.

FIG. 4 shows operation of the temperature increasing process. Part (a) of FIG. 4 shows changes in the third pressure P3 during the fuel pressure control. The solid line in part (a) indicates changes in the third pressure P3 in the present embodiment. The long-dash double-short-dash line in part (a) shows a comparative example with respect to the present embodiment, and indicates changes in the third pressure P3 in a case in which the temperature increasing mechanism 300 is not provided. Part (b) of FIG. 4 shows an operation state of the second shut-off valve 22 in the present embodiment. Part (c) of FIG. 4 is a comparative example with respect to the present embodiment, and shows an operation state of the second shut-off valve 22 in a case in which the temperature increasing mechanism 300 is not provided.

During execution of the fuel pressure control, the upstream-side fuel pipe 41 and the pipe 330 are in a flow connection state. Therefore, the fuel that has received heat from the internal combustion engine 10, which is a heat source, flows into the second shut-off valve 22. For this reason, in the present embodiment, during execution of the fuel pressure control, the temperature of the inflow fuel, which is fuel flowing into the second shut-off valve 22, is increased. When the temperature of the inflow fuel, which is gas fuel, is increased in this manner, the viscosity of the inflow fuel increases and the density thereof decreases. Accordingly, the mass flow rate of the fuel flowing into the fuel passage connected to the downstream side of the second shut-off valve 22 decreases. Therefore, the rate of increase in the third pressure P3, which is the fuel pressure in the fuel passage, is lower than that in the comparative example. When the rate of increase in the third pressure P3 decreases, the time required for the third pressure P3 to reach the upper limit value PtU increases. Therefore, a valve open time Top of the second shut-off valve 22 is longer than a valve open time Topc in the comparative example. When the valve open time Top of the second shut-off valve 22 becomes longer, an opening and closing cycle CY of the second shut-off valve 22 becomes longer than an opening and closing cycle CYc in the comparative example. Accordingly, the number of times of opening and closing of the second shut-off valve 22 during the execution of the fuel pressure control decreases.

Advantages of the Present Embodiment (1) During execution of the fuel pressure control, the controller 100 executes the temperature increasing process to operate the temperature increasing mechanism 300 such that the temperature of the inflow fuel, which is fuel flowing into the second shut-off valve 22, is increased. This increases the temperature of the inflow fuel flowing into the second shut-off valve 22. An increase in the temperature of the inflow fuel which flows into the second shut-off valve 22 reduces the number of times of opening and closing of the second shut-off valve 22 during the execution of the fuel pressure control, as described above. Accordingly, the wear of the second shut-off valve 22 due to the opening and closing operation is suppressed. Further, since the number of times of opening and closing of the second shut-off valve 22 is reduced, heat generation of the second shut-off valve 22 is also suppressed.

(2) Since the opening and closing cycle CY of the second shut-off valve 22 becomes longer, the fluctuation cycle of the third pressure P3 also becomes longer. This suppresses pressure fluctuation of the fuel supplied to the fuel injection valves 15.

(3) The temperature increasing mechanism 300 includes the pipe 330, the first electromagnetic valve 310, and the second electromagnetic valve 320. Fuel that has received heat from the internal combustion engine 10, which is a heat source, flows through the pipe 330. The pipe 330 is connected in parallel to the upstream-side fuel pipe 41. The first electromagnetic valve 310 and the second electromagnetic valve 320 regulate the flow connection state between the upstream-side fuel pipe 41 and the pipe 330. Then, as the temperature increasing process, the controller 100 operates both the first electromagnetic valve 310 and the second electromagnetic valve 320 such that the upstream-side fuel pipe 41 and the pipe 330 are in a flow connection state. Accordingly, during execution of the fuel pressure control, the fuel that has received heat from the internal combustion engine 10 flows from the pipe 330 to the upstream-side fuel pipe 41. Therefore, during execution of the fuel pressure control, it is possible to increase the temperature of the inflow fuel flowing into the second shut-off valve 22.

(4) The fuel used in the internal combustion engine 10 is a gas fuel. Unlike liquid fuels such as gasoline, gas fuels have poor lubricity. Therefore, in the second shut-off valve 22, which repeatedly opens and closes, wear due to sliding is likely to progress. In this regard, the present embodiment reduces the number of times of opening and closing of the second shut-off valve 22 during the execution of the fuel pressure control, as described above. This configuration therefore suppresses the wear of the second shut-off valve 22 disposed in the fuel system of the internal combustion engine 10, which uses the gas fuel.

Modifications

The above-described embodiment may be modified as follows. The above-described embodiment and the following modifications can be combined as long as the combined modifications remain technically consistent with each other.

Figure 5:
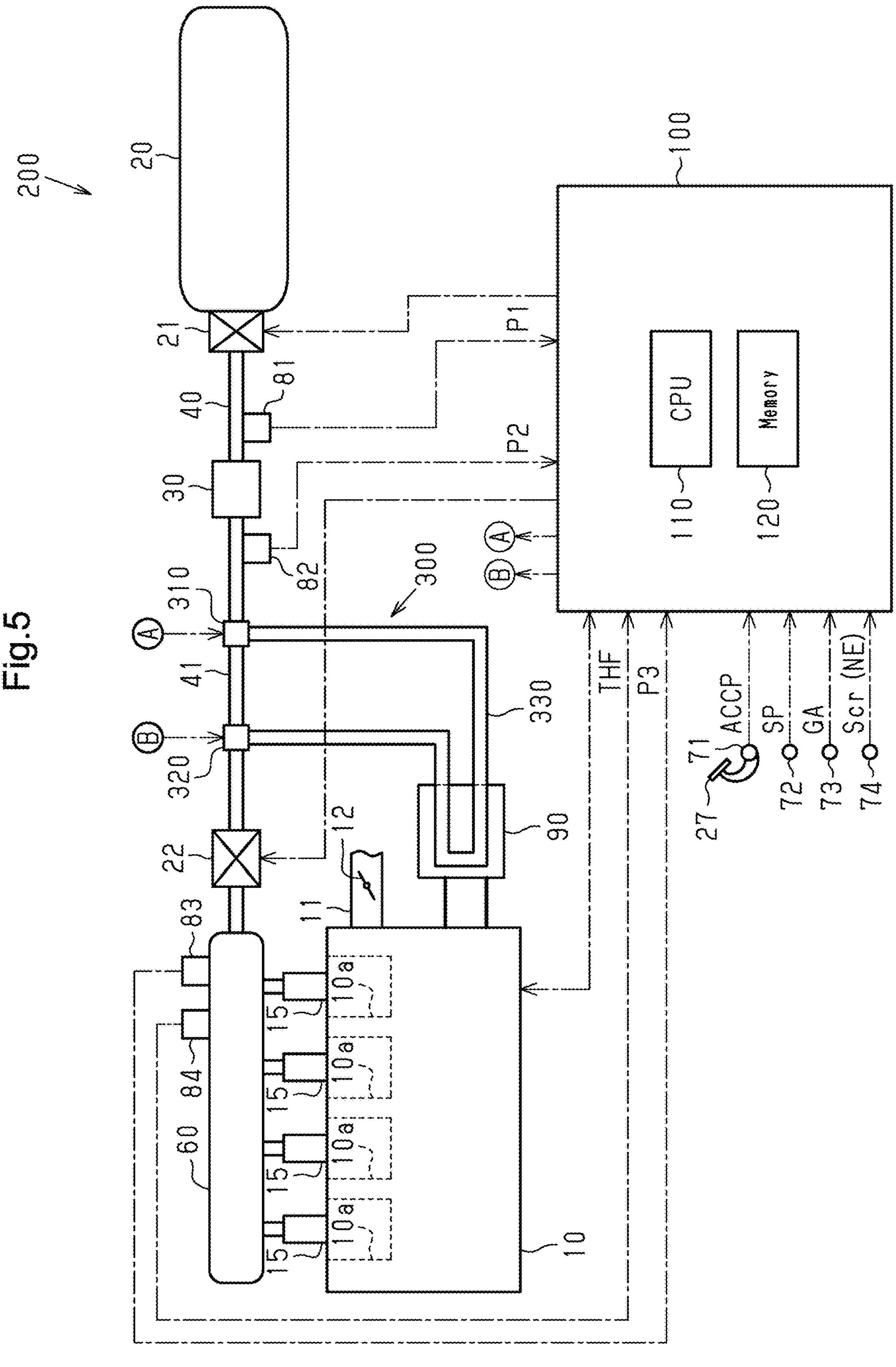
FIG. 5 is a schematic diagram showing a temperature increasing mechanism according to a modification.

As shown in FIG. 5, the internal combustion engine 10 includes a radiator 90 that performs heat exchange with coolant of the internal combustion engine 10. A part of the pipe 330 may be disposed so as to pass through the vicinity of the radiator 90 as a heat source. In this case, the radiator 90 serves as a heat source of the temperature increasing mechanism 300. In the case of this modification, the pipe 330 is preferably disposed on the side of the radiator 90 from which the traveling wind flows out. Further, a part of the pipe 330 may be configured to pass through the inside of the radiator 90.

Figure 6:
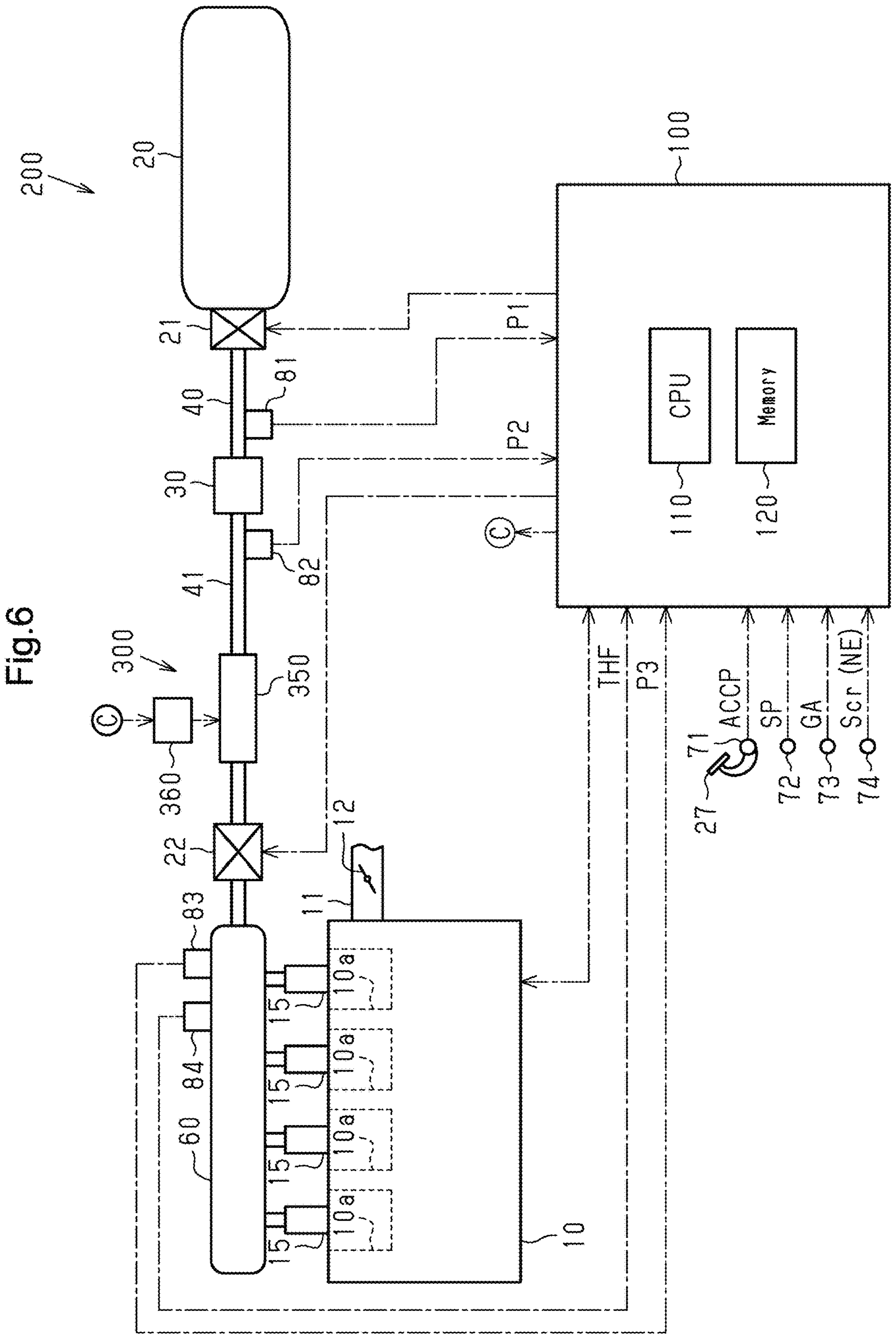
FIG. 6 is a schematic diagram showing a temperature increasing mechanism according to a modification.

As shown in FIG. 6, the temperature increasing mechanism 300 may have a heater 350 provided in the upstream-side fuel pipe 41. Then, as the temperature increasing process, the controller 100 may execute a process of manipulating the operating state of the heater 350 so that the temperature of the fuel flowing through the upstream-side fuel pipe 41 is increased. For example, in a case where the heater 350 is of an electric type, the controller 100 may execute, as the temperature increasing process, a process of changing the operation state of the heater 350 from off to on by operating the power supply circuit 360 that controls energization to the heater 350. For example, when the heater 350 uses the coolant of the internal combustion engine 10 as a heat source, the controller 100 can perform the following process as the temperature increasing process. That is, as the temperature increasing process, the controller 100 may perform a process of changing the operation state of the heater 350 from the low temperature state to the high temperature state by operating a valve that performs on/off control of the circulation of the coolant to the heater 350.

By providing a temperature sensor in the upstream-side fuel pipe 41, a fuel temperature TH which is a temperature of the fuel flowing into the second shut-off valve 22 is detected. When the fuel temperature TH reaches a predetermined upper limit temperature THU during the execution of the fuel pressure control, the temperature increasing process is stopped. On the other hand, when the fuel temperature TH reaches a predetermined lower limit temperature THL lower than the upper limit temperature THU during the execution of the fuel pressure control, the temperature increasing process may be executed.

Any one of the first electromagnetic valve 310 and the second electromagnetic valve 320 may be omitted.

The second shut-off valve 22 may be a two stage valve including a pilot valve for a small flow rate suitable for adjustment of the fuel injection amount when the requested injection amount Qd is small and a main valve for a large flow rate suitable for adjustment of the fuel injection amount when the requested injection amount Qd is large. In this case, it is preferable to execute the above-described temperature increasing process when the fuel pressure control by the pilot valve is executed.

The temperature increasing mechanism 300 may be provided in the fuel pipe 40 between the first shut-off valve 21 and the pressure reducing valve 30.

The fuel used in the internal combustion engine 10 is hydrogen gas, which is a gas fuel, but may be another gas fuel such as compressed natural gas.

The fuel used in the internal combustion engine 10 is a gas fuel, but may be a liquid fuel.

The controller 100 is not limited to a device that includes a CPU and a memory and executes software processing. For example, the controller 100 may include a dedicated hardware circuit, such as an application specific integrated circuit (ASIC), that performs hardware processing on at least a part of the software processing in the above-described embodiment. That is, the controller 100 may be modified as long as it includes processing circuitry that has any one of the following configurations (a) to (c). (a) Processing circuitry including at least one processor that executes all of the above-described processes according to programs and at least one program storage device such as a ROM that stores the programs. (b) Processing circuitry including at least one processor and at least one program storage device that execute part of the above-described processes according to the programs and at least one dedicated hardware circuit that executes the remaining processes. (c) Processing circuitry including at least dedicated hardware circuit that executes all of the above-described processes. The program storage device, which is a computer-readable medium, includes any type of medium that is accessible by a general-purpose computer or a dedicated computer.

What is claimed is:

1. A fuel supply device for an internal combustion engine, the device comprising:

a tank that stores fuel;

a fuel injection valve that supplies fuel to a cylinder;

a fuel passage that supplies the fuel in the tank to the fuel injection valve;

an electromagnetic valve that is provided in the fuel passage so as to open and close the fuel passage;

a temperature increasing mechanism that increases a temperature of an inflow fuel that is fuel flowing into the electromagnetic valve; and a processing circuitry that executes a fuel pressure control, wherein in the fuel pressure control, the electromagnetic valve is repeatedly opened and closed such that a fuel pressure in a section of the fuel passage connected to a downstream side of the electromagnetic valve in a flow direction of the fuel in the fuel passage is controlled, and that a fuel pressure in the fuel passage falls within a range defined by an upper limit value and a lower limit value, and the processing circuitry is configured to execute a temperature increasing process that operates the temperature increasing mechanism to increase the temperature of the inflow fuel during execution of the fuel pressure control.

2. The fuel supply device for the internal combustion engine according to claim 1, wherein a section of the fuel passage that is connected to an upstream side of the electromagnetic valve in the flow direction of the fuel in the fuel passage is referred to as an upstream-side fuel passage, the temperature increasing mechanism includes:

a pipe through which the fuel that has received heat from a heat source flows, the pipe being connected in parallel to the upstream-side fuel passage; and an operation valve that regulates a flow connection state between the upstream-side fuel passage and the pipe, and in the temperature increasing process, the operation valve is operated to establish a flow connection state between the upstream-side fuel passage and the pipe.

3. The fuel supply device for the internal combustion engine according to claim 2, wherein the heat source is the internal combustion engine.

4. The fuel supply device for the internal combustion engine according to claim 2, wherein the heat source is a radiator that performs heat exchange with a coolant of the internal combustion engine.

5. The fuel supply device for the internal combustion engine according to claim 1, wherein a section of the fuel passage that is connected to an upstream side of the electromagnetic valve in the flow direction of the fuel in the fuel passage is referred to as an upstream-side fuel passage, the temperature increasing mechanism is a heater disposed in the upstream-side fuel passage, and in the temperature increasing process, an operation state of the heater is controlled such that the temperature of the fuel flowing through the upstream-side fuel passage is increased.

* * * * *